Patented Oct. 19, 1943

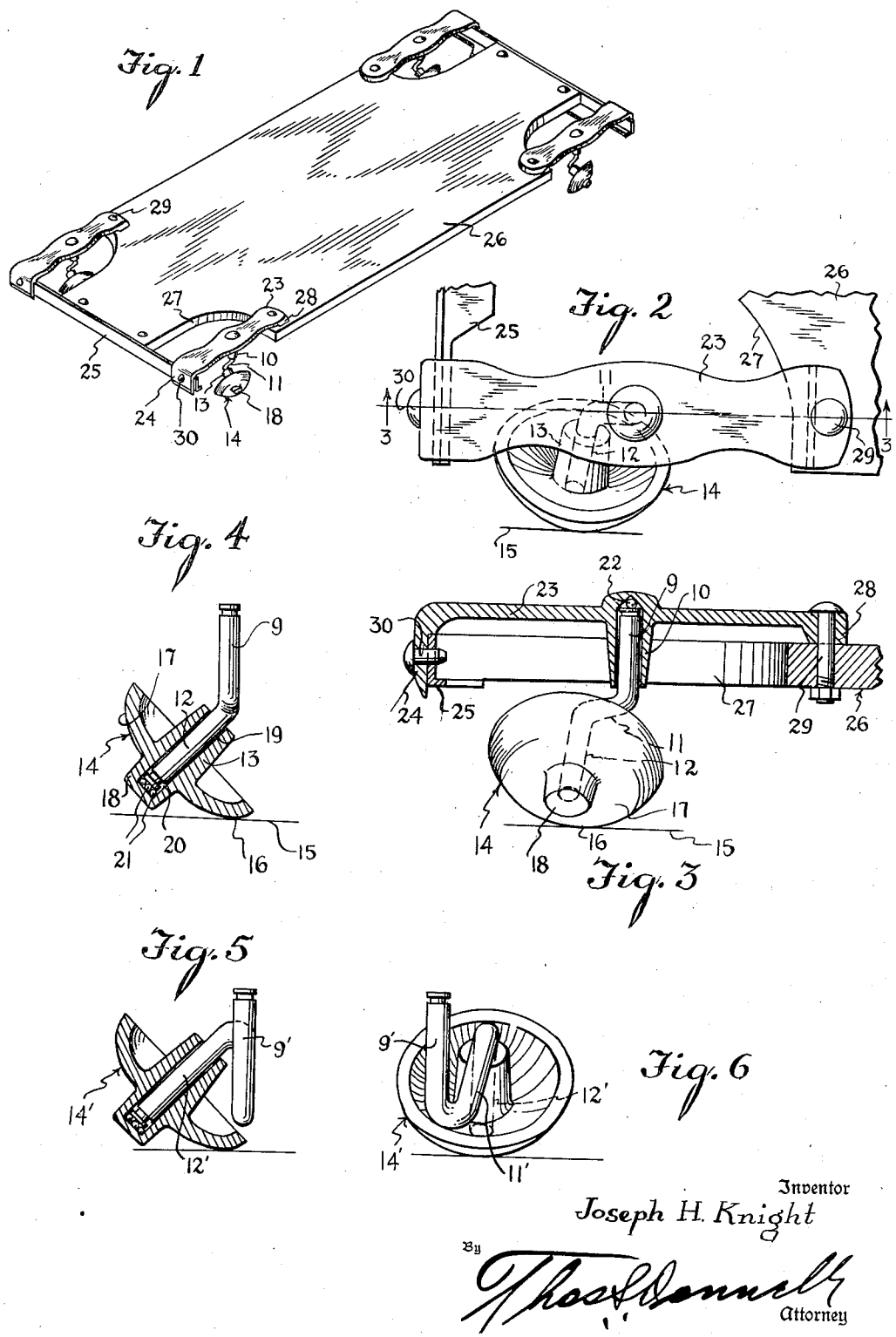

2,332,089

UNITED STATES PATENT OFFICE 2,332,089

CASTER

Joseph H. Knight, Belleville, Mich.

Application April 16, 1941, Serial No. 388,829

1 Claim. (Cl. 16—46)

My invention relates to a new and useful improvement in a caster and mounting therefor, adapted for mounting on various types of structures such as furniture, trucks, etc., to afford a means of easy traction which will facilitate ease in rolling.

It is an object of the present invention to provide a caster whereby the swiveling may be easily and quickly effected.

Another object of the invention is the provision of a caster so arranged and constructed that it may function when swung either to the right or left so that the swiveling of the caster from one operative position to another is 180°, thus making it possible for the caster to swing out of engagement of an obstruction into a separated path of operation.

Another object of the invention is the provision of a caster having a supporting spindle and a roller, rotatably mounted on an axis extending normally at an incline to the surface over which the caster is drawn and so constructed and arranged that the thrust delivered to the roller will extend throughout the area of the roller and avoid concentration of a thrust to any localized point.

Another object of the invention is the provision of a caster having a roller rotating on an inclined axis and provided with a spindle structure whereby resiliency may be imparted to the roller mounting.

Another object of the invention is the provision, in combination with a caster of this type, of a mounting whereby the caster may be easily and quickly applied and provided with clearance for its swinging movement.

Another object of the invention is the provision of a caster embodying a roller rotatably mounted on an inclined axis having a resilient portion thereon so constructed and arranged that resiliency will be imparted to the caster mounting and the center of gravity of the caster structure lowered to its maximum.

Another object of the invention is the provision of a caster and mounting therefor so arranged and constructed that the thrust delivered to the caster will be through a member, a portion of which is in tension rather than in compression.

Other objects will appear hereinafter.

It is recognized that various modifications and changes from the detail of structure illustrated may be made without departing from the spirit of the invention and it is intended that such variations and modifications shall be embraced within the scope of the claim attached hereto and forming a part hereof.

Forming a part of the specification is a drawing in which;

Fig. 1 is a perspective view of a creeper with the invention applied.

Fig. 2 is a fragmentary top plan view of the creeper showing the invention applied.

Fig. 3 is a sectional view taken on line 3—3 of Fig. 2.

Fig. 4 is a central, vertical, sectional view through the caster.

Fig. 5 is a central, vertical, sectional view of a modified form of the caster.

Fig. 6 is a perspective view of the modified form of caster.

In Fig. 1 I have illustrated the invention applied to a structure known as a "creeper." This device is used for serving as a means to enter narrow places beneath a body such as beneath a body of an automobile or the like. In the drawing I have illustrated two forms of casters, both forms having some characteristics which are common. In the form illustrated in Fig. 3 and Fig. 4 a spindle is provided having a vertically directed portion 9 which is adapted for entering a socket or sleeve 10 on the body which is to be supported. This vertically directed portion 9 is connected by the angularly turned, downwardly inclined portion 11 with a further angularly turned portion 12 which serves as a supporting shaft. This portion 12 enters the sleeve or bearing 13 formed on the cup-shaped roller or concavo-convex disc 14 which is circular in cross-section and which is adapted to bear on the supporting surface 15 along a line 16. Projecting outwardly from the substantially uniformly curved base face 17 of the roller 14 is a boss 18 which has a socket therein to form a continuation of the bore 19 of the sleeve 13. Consequently, the portion 12 extends through and beyond the location of the base 14 of the roller. Positioned in the bottom of the socket 20 in the bore 18 is a plurality of balls or roller-bearings 21 which serve as a thrust bearing for the lower end of the shaft 12. By extending the boss 18 beyond the face 17 and providing it with the socket into which the shaft projects, a wider area of lateral thrust is provided and a distribution of the lateral thrust is thus obtained. This has considerable advantage over a structure in which the boss 18 would be absent, inasmuch as in such structures the thrust would be delivered through the sleeve 13 to the roller 14. In the present structure a direct delivery is possible, thus relieving the sleeve 13 of considerable strain and eliminating fractures commonly encountered. In use, the roller 14 rotates on the shaft 12 and the spindle is permitted to pivot on the portion 9. A ball-bearing 22 also serves to engage the end face of the vertically directed portion 9 of the spindle.

With a caster constructed in this manner a durable construction is provided and one which will afford a maximum efficiency in use. In order to mount the structure I have devised a special type of bracket. As illustrated, the bar 23 having a downwardly turned end 24 which is secured to an angle iron 25 extending transversely of the body 26 of the creeper, at its opposite sides, the body 26 being cut away as at 27 to provide the necessary clearance for the swinging of the caster on the part 9 as a pivot. The opposite end of the bar 23 is provided with a downwardly directed boss 28 through which a bolt 29 may be projected for securing the structure to the body 26. A bolt or pin 30 is projected through the angularly turned portion 24 for securing this part to the angle iron 25. Experience has shown that this is a simple and effective method of mounting the caster on a supporting body. By raising or lowering the end 30 the spindle portion 9 may be easily and quickly adjusted to extend vertically and by making the cut away as at 27 the necessary clearance for the roller 14 is provided.

In Fig. 5 and Fig. 6 I have shown a slightly different form of structure. The axle-forming portion 12' corresponds to the portion 12 shown in Fig. 4, and the spindle-forming portion 9' corresponds to the portion 9 shown in Fig. 4. The upper end of the shaft 12 is angularly turned and directed downwardly to form the portion 11' and then the portion 9' is bent upwardly to form the portion 9'. Thus the rod from which this structure is made is bent downwardly or doubled upon itself downwardly and this downwardly doubled portion is doubled over upon itself upwardly, the portion 11' being doubled downwardly in a different direction than the portion 9' is doubled upwardly. With a caster constructed in this manner the thrust is delivered to portion 9' through the lower end of the portion 11' which in turn delivers it through the shaft-forming portion 12' to the roller 14', this roller 14' being constructed in all respects as the roller 14. The member 9' pushes downwardly on the lower end of the member 11' and this member, at its upper end, pulls downwardly on the shaft-forming portion 12'. It also renders a certain amount of resiliency to the mountings of the roller and, in this way a very efficient, and durable structure is provided having all of the advantages of the form illustrated in Fig. 4.

What I claim as new is:

A caster wheel comprising a circular disc having a concave inner face and a substantially uniformly curved convex outer face, the peripheral portion of the latter face constituting the surface on which the caster is adapted to roll, said disc having a centrally disposed long hollow hub projecting from the concave inner face beyond the plane of the periphery of said disc and a shorter hollow closed boss projecting from said convex outer face, said hub and boss being aligned and in communication, said disc and its hub and boss being structurally integral.

JOSEPH H. KNIGHT.